United States Patent
Kuppannan et al.

(10) Patent No.: US 11,463,358 B2
(45) Date of Patent: *Oct. 4, 2022

(54) TRANSLATION BETWEEN A FIRST VERSION OF INTERNET PROTOCOL AND A SECOND VERSION OF INTERNET PROTOCOL WHEN AN APPLICATION LAYER GATEWAY (ALG) IS INVOLVED

(71) Applicant: Juniper Networks, Inc., Sunnyvale, CA (US)

(72) Inventors: Jayaraghavendran Kuppannan, Bangalore (IN); Neeraj Gupta, Bangalore (IN); Sridhar O S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 16/811,263

(22) Filed: Mar. 6, 2020

(65) Prior Publication Data

US 2020/0213229 A1    Jul. 2, 2020

Related U.S. Application Data

(63) Continuation of application No. 15/637,467, filed on Jun. 29, 2017, now Pat. No. 10,659,356.

(51) Int. Cl.
*H04L 45/741* (2022.01)
*H04L 61/251* (2022.01)
(Continued)

(52) U.S. Cl.
CPC ......... *H04L 45/741* (2013.01); *H04L 45/748* (2013.01); *H04L 61/251* (2013.01);
(Continued)

(58) Field of Classification Search
CPC ... H04L 45/741; H04L 45/748; H04L 61/251; H04L 61/256; H04L 61/2575;
(Continued)

(56) References Cited

U.S. PATENT DOCUMENTS

2006/0227792 A1* 10/2006 Wetterwald ............. H04W 8/26
370/395.52
2012/0110210 A1    5/2012 Huang et al.
(Continued)

FOREIGN PATENT DOCUMENTS

CN           103297336 A      9/2013

OTHER PUBLICATIONS

Srisuresh P., Lucent Technologies, "The IP Network Address Translator (NAT); draft-rfced-info-srisuresh-05.txt", Internet Engineering Task Force (IETF), Internet Society (ISOC), Geneva, Switzerland, No. 5, Feb. 1, 1988, XP015034506, 21 pages.
(Continued)

*Primary Examiner* — Sm A Rahman
(74) *Attorney, Agent, or Firm* — Harrity & Harrity, LLP

(57) ABSTRACT

A device may receive, from a first device, a port control protocol (PCP) request that includes a customer side translator (CLAT) prefix and one or more private internet protocol version X (IPvX) addresses. The PCP request may be received via an internet protocol version Y (IPvY) network. The device may store the CLAT prefix and the one or more private IPvX addresses using a data structure. The device may receive a packet that includes a private IPvX of the one or more private IPvX addresses and a private IPvY address that includes the CLAT prefix and a second instance of the private IPvX address. The device may use an application layer gateway (ALG). The device may translate the private IPvX address to a public IPvX address using the CLAT
(Continued)

prefix. The device may provide the packet that includes the public IPvX address to a second device that supports IPvX.

20 Claims, 6 Drawing Sheets

(51) Int. Cl.
*H04L 61/2575* (2022.01)
*H04L 45/748* (2022.01)
*H04L 61/256* (2022.01)
*H04L 61/2585* (2022.01)
*H04L 101/686* (2022.01)
*H04L 101/659* (2022.01)

(52) U.S. Cl.
CPC ........ *H04L 61/256* (2013.01); *H04L 61/2575* (2013.01); *H04L 61/2585* (2013.01); *H04L 2101/659* (2022.05); *H04L 2101/686* (2022.05)

(58) Field of Classification Search
CPC ........... H04L 61/2585; H04L 2101/659; H04L 2101/686; H04L 61/2521
See application file for complete search history.

(56) References Cited

U.S. PATENT DOCUMENTS

| | | | |
|---|---|---|---|
| 2012/0203909 A1* | 8/2012 | Kavanaugh | H04L 61/2517 709/226 |
| 2014/0215179 A1 | 7/2014 | Matsuhira | |
| 2015/0249668 A1* | 9/2015 | Reddy | H04L 65/60 726/4 |
| 2019/0007314 A1 | 1/2019 | Kuppannan et al. | |

OTHER PUBLICATIONS

Boucadair., "Discovering NAT64 IPv6 Prefixes Using the Port Control Protocol (PCP); rfc7225.txt," Discovering NAT64 IPV6 Prefixes using the Port Control Protocol (PCP); rfc7225.txt, Internet Engineering Task Force, IETF; Standard. Internet Society (ISOC) 4, Rue Des Falaises Ch—1205, Geneva, Switzerland, May 16, 2014, pp. 1-17, XP015100669, [retrieved on May 16, 2014].
Extended European Search Report for Application No. EP18175311. 2, dated Nov. 7, 2018, 8 pages.
Martinez P., et al., "Basic Requirements for IPv6 Customer Edge Routers; draft-v6ops-rfc7084-bis-00.txt," Basic Requirements for IPV6 Customer Edge Routers; Draft-v6ops-rfc7084-bis-00.txt, Internet Engineering Task Force, IETF; Standardworkingdraft, Internet Society (ISOC), 4. Rue Des Falaises, Ch—1205, Geneva, Switzerland, Apr. 2, 2017, pp. 1-29, XP015119068 [retrieved on Apr. 2, 2017].
Mawatari et al.,"464XLAT: Combination of Stateful and Stateless Translation; rfc6877.txt," 464XLAT: Combination of Stateful and Stateless Translation; rfc6877.txt, Internet Engineering Task Force, IETF; Standard, Internet Society (ISOC) 4 Rue Des Falaises Ch—1205 Geneva, Switzerland, Apr. 3, 2013, pp. 1-14, XP015090335 [retrieved on Apr. 3, 2013].
Sun Q., et al., "Running Multiple PLATs in 464XLAT; draft-sun-v6ops-xlat-multi-02.txt," Running Multiple Plats in 464XLAT; Draft-SUN-V60PS-XLAT-MULTI-02.TXT, Internet Engineering Task Force, IETF; Standardworkingdraft, Internet Society (ISOC), 4. Rue Des Falaises, Ch—1205, Geneva, Switzerland, Jun. 26, 2015, pp. 1-8, XP015106904 [retrieved on Jun. 26, 2015].
Extended European Search Report for Application No. EP21152675. 1, dated May 31, 2021, 9 pages.

* cited by examiner

TRANSLATION BETWEEN A FIRST VERSION OF INTERNET PROTOCOL AND A SECOND VERSION OF INTERNET PROTOCOL WHEN AN APPLICATION LAYER GATEWAY (ALG) IS INVOLVED

RELATED APPLICATION

This application is a continuation of U.S. patent application Ser. No. 15/637,467, filed Jun. 29, 2017, the content of which is incorporated herein by reference.

BACKGROUND

Internet protocol (IP) is a communications protocol used for sending and receiving packets over a network (e.g., the Internet). Network address translators (NATs) may provide translation of IP addresses in packets between private IP addresses and public IP addresses. Furthermore, NATs may support translation of IP addresses between different versions of IP and between the same versions of IP.

SUMMARY

According to some possible implementations, a device may receive, from a first device that supports internet protocol version 4 (IPv4), a port control protocol (PCP) request that includes a customer side translator (CLAT) prefix and one or more private IPv4 addresses. The PCP request may be received via an internet protocol version 6 (IPv6) network. The device may establish an association between the CLAT prefix and the one or more private IPv4 addresses. The device may receive, from the first device and via the IPv6 network, a packet that includes a private IPv4 address of the one or more private IPv4 addresses and an IPv6 address that includes the CLAT prefix and a second instance of the private IPv4 address. The private IPv4 address may be associated with a payload of the packet. The IPv6 address may be associated with a header of the packet. The device may translate the private IPv4 address to a public IPv4 address using the CLAT prefix. The device may provide the packet that includes the public IPv4 address to a second device that supports IPv4.

According to some possible implementations, a method may include receiving, by a device and from a first device, a port control protocol (PCP) request that includes a customer side translator (CLAT) prefix and one or more private internet protocol version X (IPvX) addresses. The PCP request may be received via an internet protocol version Y (IPvY) network, where X is not equal to Y. The method may include storing, by the device, the CLAT prefix and the one or more private IPvX addresses using a data structure. The method may include receiving, by the device and from the first device, a packet that includes a private IPvX address of the one or more private IPvX addresses and a private IPvY address that includes the CLAT prefix and a second instance of the private IPvX address. The device may use an application layer gateway (ALG). The method may include translating, by the device, the private IPvX address to a public IPvX address using the CLAT prefix. The method may include providing, by the device, the packet that includes the public IPvX address to a second device that supports IPvX.

According to some possible implementations, a non-transitory computer-readable medium may store one or more instructions that, when executed by one or more processors, cause the one or more processors to receive, from a first device, a port control protocol (PCP) request that includes a customer side translator (CLAT) prefix and one or more private internet protocol version X (IPvX) addresses. The PCP request may be received via an internet protocol version Y (IPvY) network. The one or more instructions may cause the one or more processors to receive, from the first device, a packet that includes a private IPvX address of the one or more private IPvX addresses and a private IPvY address that includes the CLAT prefix and a second instance of the private IPvX address. The private IPvX address may be associated with a payload of the packet, and the private IPvY address may be associated with a header of the packet. The one or more instructions may cause the one or more processors to translate the private IPvX address to a public IPvX address using the CLAT prefix. The one or more instructions may cause the one or more processors to provide the packet that includes the public IPvX address to a second device that supports IPvX.

DETAILED DESCRIPTION

Figure 1A:
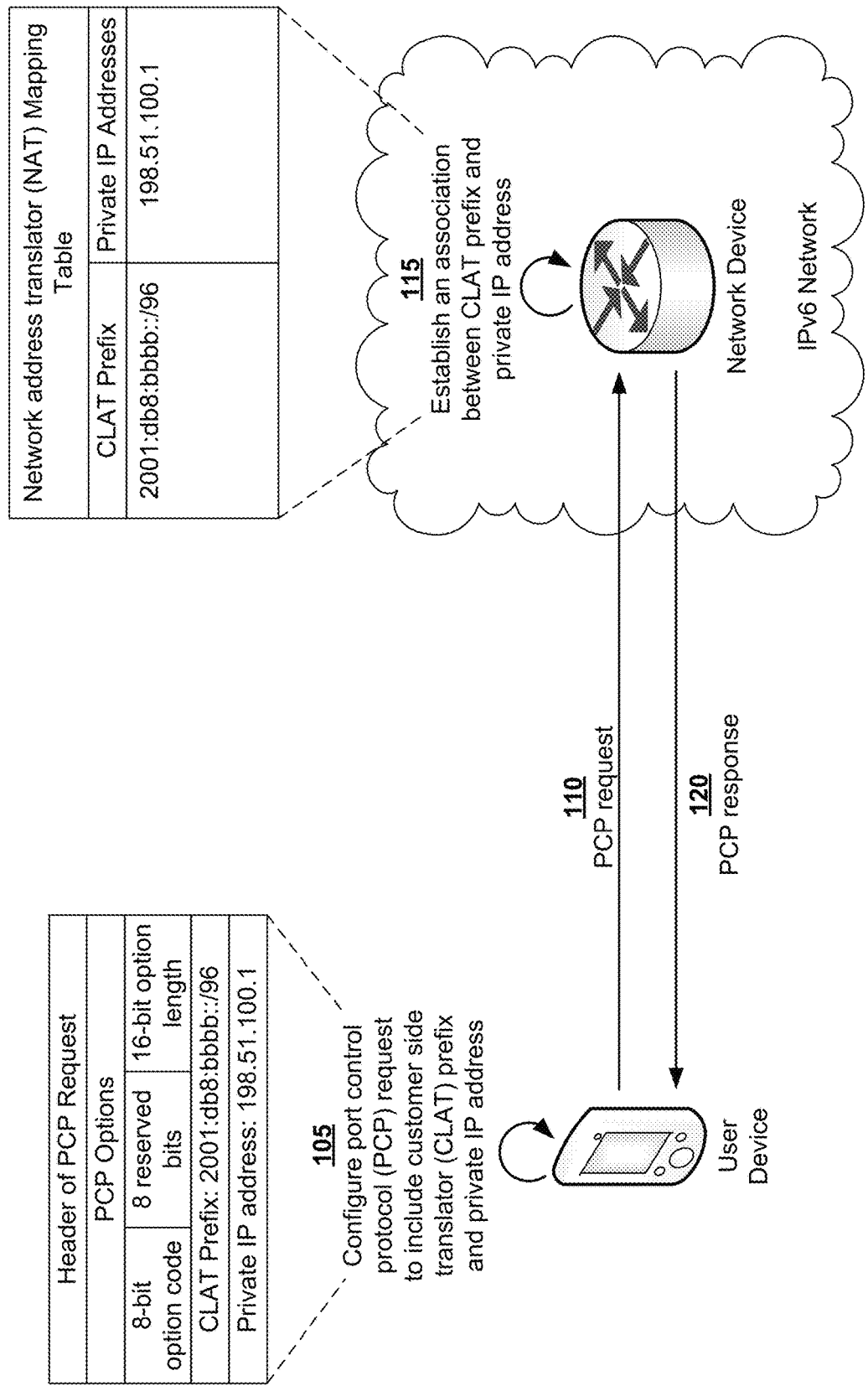
FIGS. 1A-1C are diagrams of an overview of an example implementation described herein.

The following detailed description of example implementations refers to the accompanying drawings. The same reference numbers in different drawings may identify the same or similar elements.

Some devices and/or applications may support IPv4. Other devices and/or applications may support IPv6. NATs may be used to map an address space (e.g., IPv4, IPv6, etc.) to another address space (e.g., IPv6, IPv4, etc.) by modifying network address information in IP datagram headers while the network address information is being routed between network devices.

A 464XLAT architecture provides limited IPv4 connectivity over an IPv6 network by using stateful protocol translations at core devices and stateless protocol translations at edge devices. For example, an application hosted by a first device may support IPv4 and may need to send an IPv4 packet over an IPv6 network to a second device that also supports IPv4. In this case, the first device may use a customer side translator (CLAT) to perform a stateless translation of IPv4 addresses to IPv6 addresses.

In a stateless translation, the CLAT may translate the IPv4 packet to an IPv6 packet. For example, the CLAT may translate a private IPv4 address included in a header of the packet to an IPv6 address by appending a CLAT prefix to the IPv4 address. Additionally, the first device may provide the IPv6 packet to a network device associated with the IPv6 network. In this case, the network device may use a provider side translator (PLAT) to translate the IPv6 packet to an IPv4 packet, and may translate the IPv6 address to a public IPv4 address without using the CLAT prefix. Furthermore, the network device may provide the IPv4 packet to the second device.

However, if an application layer gateway (ALG) is used, a payload of the IPv4 packet may include private IPv4 addresses that need translation but that are unable to be read using the CLAT of 464XLAT. In this case, the CLAT may perform a stateless translation of IPv4 addresses included in a header of the IPv4 packet, but may be unable to translate private IPv4 addresses included in the payload of the IPv4 packet. As such, when the PLAT receives the IPv6 packet, the PLAT may be unable to identify the private IPv4 address included in an IPv6 address that is stored in the header of the packet when it does not have the corresponding CLAT prefix. Without a way to identify the private IPv4 address, the PLAT may be unable to translate to a public IPv4 address. Additionally, manual configuration of a CLAT prefix may be difficult when there are millions, even billions, of CLAT prefixes associated with internet service provider (ISP) networks.

Some implementations described herein provide a network device hosting a PLAT to translate a private IPv4 address to a public IPv4 address and vice versa when the private IPv4 address is included in a payload of a packet. For example, assume a first device that supports IPv4 provides a port control protocol (PCP) request to a network device of an IPv6 network. In this case, the PCP request may include a CLAT prefix and one or more private IPv4 addresses.

Additionally, the network device may receive a first packet that includes a private IPv4 address of the one or more private IPv4 addresses in a payload of the first packet. In this case, the network device may translate the private IPv4 address to a public IPv4 address using the CLAT prefix obtained during the PCP request. Furthermore, the network device may provide the first packet that includes the public IPv4 address to the second device. A similar process may be used to send a second packet from the second device to the first device, using the network device as an intermediary, with each device performing a reverse translation, as described further herein.

In this way, a first device that supports IPv4 may send and receive packets to a second device that supports IPv4 and uses an ALG, using an IPv6 network as an intermediary. Additionally, by using a PCP request to obtain a CLAT prefix, the network device conserves processing resources relative to network devices with manually configured CLAT prefixes. Furthermore, automatically assigning CLAT prefixes during the PCP request improves scalability, and conserves network resources that might otherwise be used to manually configure hundreds of thousands, millions, or even billions of CLAT prefixes associated with ISPs.

In the description to follow, implementations will be described in the context of translating from IPv4 to IPv6 or vice versa. In practice, one or more of these implementations may equally apply to translating from a first version of IP (referred to generally as IPvX) to a second version of IP (referred to generally as IPvY) (where X Y), where the first version of IP is different (i.e., a later version or an earlier version of IP) than the second version of IP.

Figure 1B:
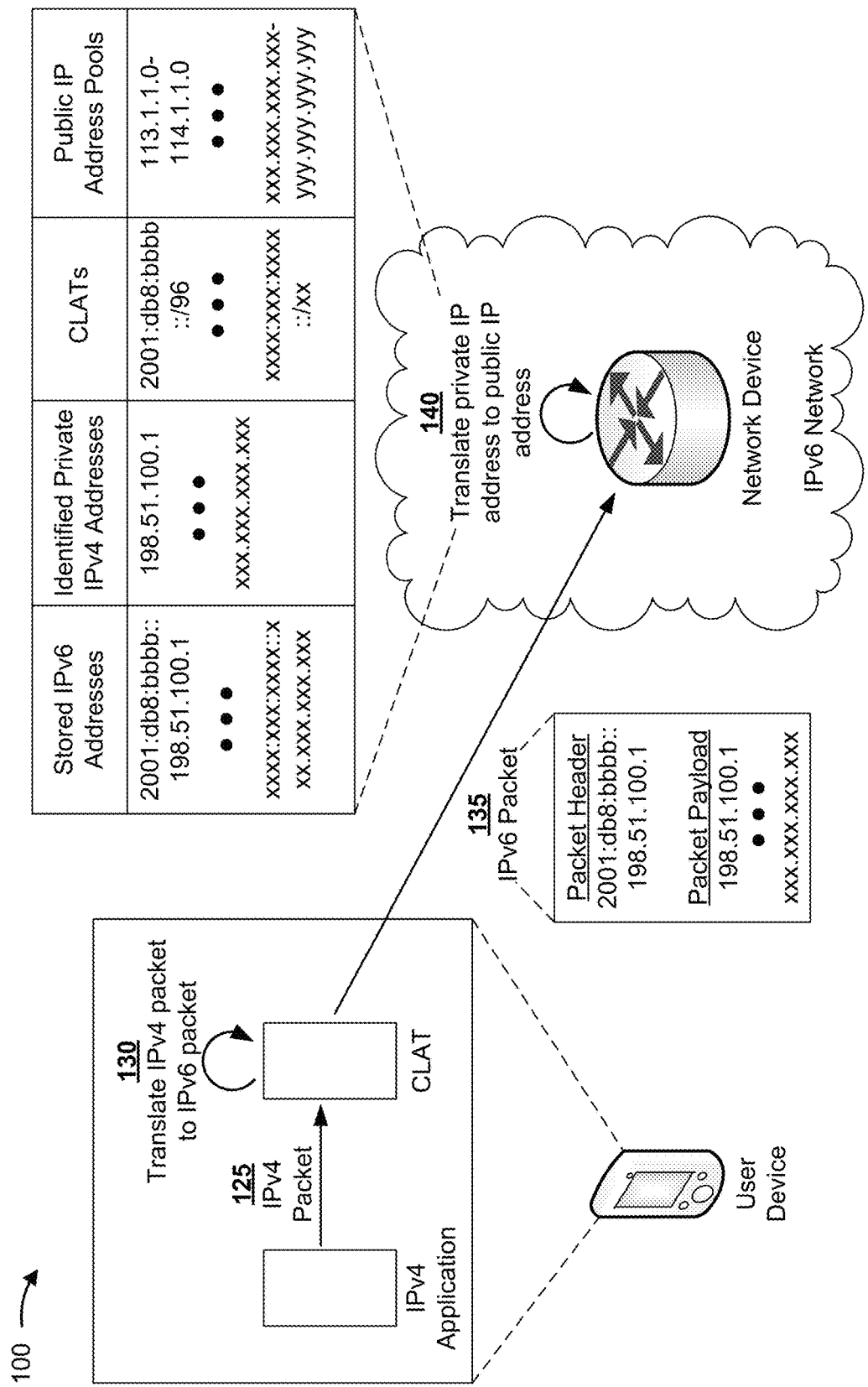
Figure 1C:
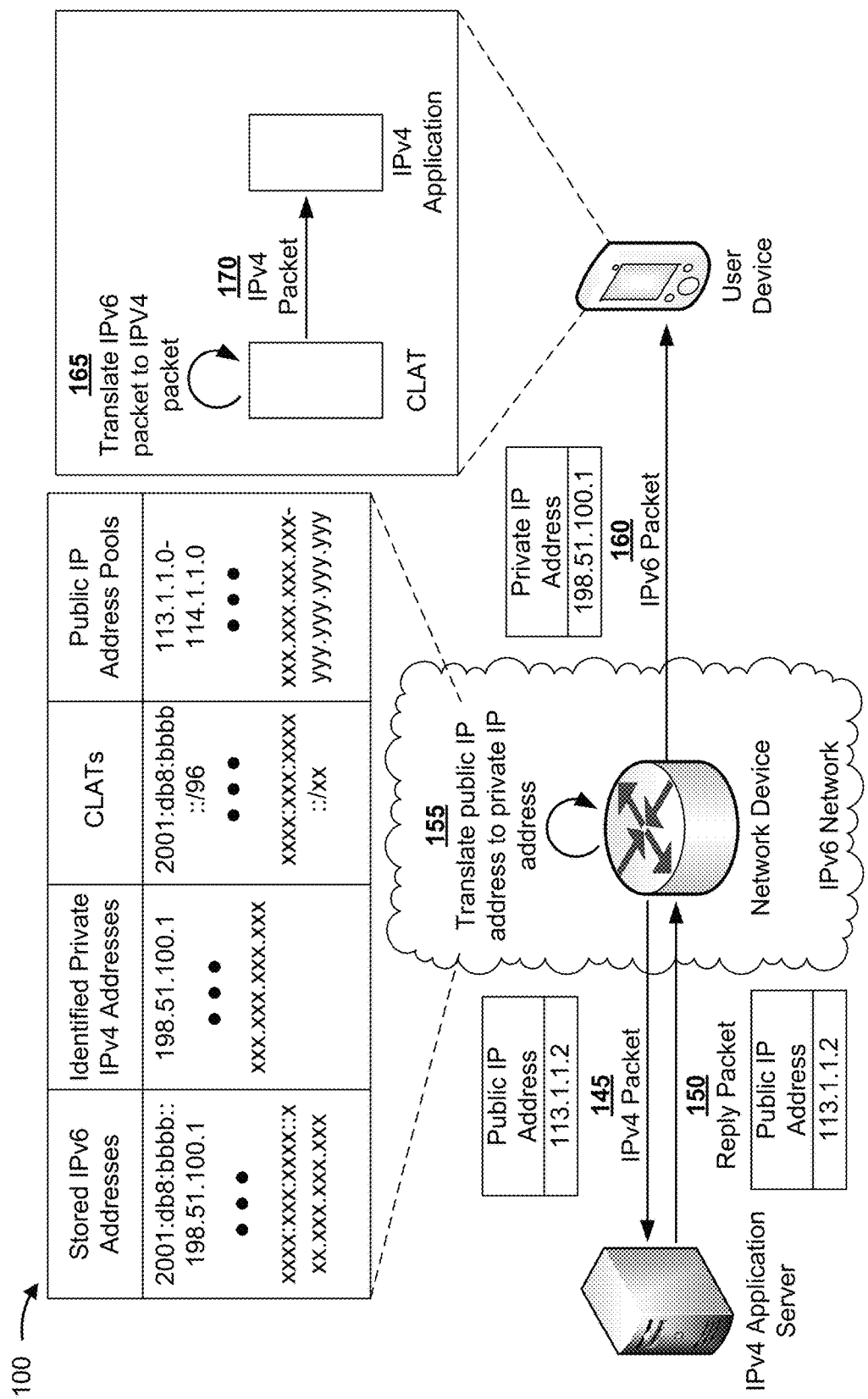

FIGS. 1A-1C are diagrams of an overview of an example implementation 100 described herein. Example implementation 100 may include a user device, a network device, and an IPv4 application server. The network device may be included in an IPv6 network (e.g., a network capable of supporting IPv4 and/or IPv6) and may host a PLAT. The user device may host an IPv4 application and a CLAT (e.g., a CLAT may run as a daemon).

As shown in FIG. 1A, and by reference number 105, the user device may configure a PCP request to include a CLAT prefix and one or more private IPv4 addresses. For example, the user device may configure a PCP request to include a CLAT prefix (e.g., 2001:db8:bbbb::/96) and a private IPv4 addresses (e.g., 198.51.100.1) in a header of the PCP request. As shown, the CLAT prefix and the private IPv4 address may be stored using a PCP options portion of the header.

As shown by reference number 110, the network device may receive the PCP request from the user device. In this case, and as shown by reference number 115, the network device may establish an association between the CLAT prefix and the private IP address. For example, the network device may store the CLAT prefix and the private IP address using a data structure, such as a NAT mapping table. As shown by reference number 120, the network device may provide a PCP response to the user device. The PCP response may indicate to the user device that the PCP request has been received by the network device.

In this way, the network device uses a data structure to associate the CLAT prefix with the private IPv4 address, and may use the data structure when performing NATs, as described further herein.

As shown in FIG. 1B, and by reference number 125, the CLAT of the user device may receive a packet (e.g., an IPv4 packet) from the IPv4 application hosted by the user device. The packet may include the private IPv4 address within a payload of the packet. Additionally, the header of the packet may include a second instance of the private IPv4 address. As shown by reference number 130, the CLAT may translate the packet from an IPv4 packet to an IPv6 packet using a stateless translation. In this case, the CLAT may append the CLAT prefix to the second instance of the private IPv4 address to convert the second instance of the private IPv4 address to an IPv6 address. However, the stateless translation will not translate the private IPv4 address included in the payload of the packet.

As shown by reference number 135, the CLAT may provide the IPv6 packet to the network device. For example, the network device may provide the IPv6 packet that includes the private IPv4 address in the payload (e.g., 198.51.100.1) and the second instance of the private IPv4 address which is embedded in the IPv6 address (e.g., 2001: db8:bbbb::198.51.100.1) included in the header.

As shown by reference number 140, the network device may translate the private IPv4 address included in the payload to a public IPv4 address. For example, the network device may identify the second instance of the private IPv4 address included in the IPv6 address by removing the CLAT prefix from the IPv6 address. Furthermore, the network device may assign a public IPv4 address to the identified second instance of the private IPv4 address, and may update the NAT mapping table to store the association between the identified second instance of the private IPv4 address and the assigned public IPv4 address.

Additionally, the network device may search the payload of the IPv6 packet to identify any private IPv4 addresses (e.g., 198.51.100.1), and may search the NAT mapping table for matching private IPv4 addresses. In this case, the network device may replace the identified private IPv4 addresses included in the payload (e.g., 198.51.100.1) with public IPv4 addresses that are associated with the matching private IPv4 addresses (e.g., 113.1.1.2).

Additionally, the network device may translate the packet from an IPv6 packet to an IPv4 packet. For example, the network device may translate the packet to an IPv4 packet to allow the packet to be processed by the IPv4 application server. In this case, the payload of the IPv4 packet may include the public IPv4 address.

In this way, the network device may translate the private IP address included in the payload of the packet to a public IP address.

As shown in FIG. 1C, and by reference number 145, the network device may provide the packet (e.g., the IPv4 packet) to the IPv4 application server. In this case, the payload of the packet may include the public IPv4 address (e.g., 113.1.1.2). As shown by reference number 150, the network device may receive a reply packet from the IPv4 application server. For example, the IPv4 application server may initiate a connection based on the public IPv4 address included in the payload of the IPv4 packet. In this case, the IPv4 application server may provide the reply packet to the network device. In some cases, a payload of the reply packet may include the public IPv4 address.

As shown by reference number 155, the network device may translate the public IPv4 address to the private IPv4 address. For example, the network device may translate the public IPv4 address to the private IPv4 address in the same manner described above (e.g., using the NAT mapping table that associates the public IPv4 address, the CLAT, and the private IPv4 address). Additionally, the network device may translate the reply packet from an IPv4 packet to an IPv6 packet, in the same manner as described above.

As shown by reference number 160, the network device may provide the reply packet (e.g., the IPv6 packet) to the user device. In this case, the payload of the reply packet may include the private IPv4 address (e.g., 198.51.100.1). As shown by reference number 165, the user device may use the CLAT to translate the reply packet from an IPv6 packet to an IPv4 packet. As shown by reference number 170, the CLAT may provide the reply packet to the IPv4 application.

In this way, packet transmission in an ALG context may occur in an IPv4 to IPv6 to IPv4 scenario.

As indicated above, FIGS. 1A-1C are provided merely as an example. Other examples are possible and may differ from what was described with regard to FIGS. 1A-1C. For example, in some implementations, a device (e.g., a router, a gateway, an edge device, etc.) may host the CLAT and may be included in a local network with one or more additional devices (e.g., a laptop, a desktop, a mobile phone, etc.). In this case, the additional devices may provide traffic (e.g., packets) to the device, and the device may provide the traffic to an IPv4 server device using an IPv6 network as an intermediary.

Figure 2:
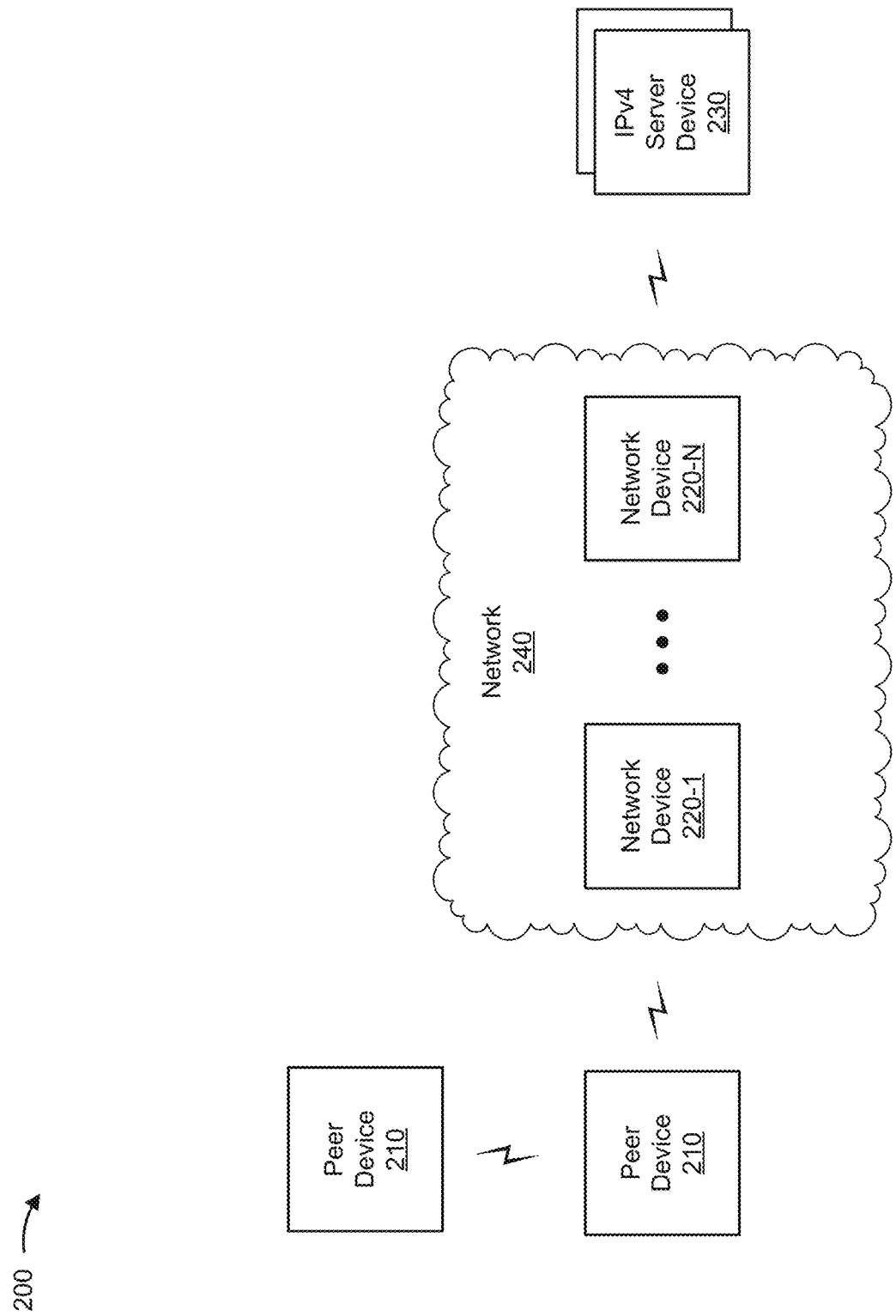
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more peer devices 210, one or more network devices 220-1 through 220-N (N≥1) (hereinafter referred to collectively as "network devices 220", and individually as "network device 220"), one or more IPv4 server devices 230, and/or a network 240. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a load balancer, or a similar type of device. Additionally, or alternatively, peer device 210 may include an endpoint device that is a source or a destination for network traffic. For example, peer device 210 may include a computer or a similar type of device.

In some implementations, peer device 210 may receive network traffic from and/or may provide network traffic to other peer devices 210. For example, a first peer device 210 may provide network traffic (e.g., an IPv4 packet) to a second peer device 210 that hosts a CLAT. In this case, the second peer device 210 may provide the network traffic to network device 220 via an IPv6 network. Additionally, the second peer device 210 may receive network traffic (e.g., a reply IPv4 packet) from network device 220, and may provide the network traffic to the first peer device 210. In some implementations, peer device 210 may host an application that supports IPv4, and may provide network traffic (e.g., an IPv4 packet associated with the application) to and/or receive network traffic from network device 220.

Network device 220 includes one or more devices (e.g., one or more traffic transfer devices) capable of processing, forwarding, and/or transferring traffic between peer devices (e.g., peer devices 210) and/or traffic transfer devices (e.g., other network devices 220). For example, network device 220 may include a router, such as a label switching router (LSR), a label edge router (LER), an ingress router, an egress router, a provider router (e.g., a provider edge router, a provider core router, etc.), a virtual router, or the like. Additionally, or alternatively, network device 220 may include a gateway, a switch, a firewall, a hub, a bridge, a reverse proxy, a server (e.g., a proxy server, a cloud server, a data center server, etc.), a load balancer, or another type of traffic transfer device. In some implementations, network device 220 may be a physical device implemented within a housing, such as a chassis. In implementations, network device 220 may be a virtual device implemented by one or more computer devices of a cloud computing environment or a data center.

IPv4 server device 230 includes one or more devices capable of receiving and/or providing network traffic. For example, IPv4 server device 230 may include a server device (e.g., a host server, a web server, an application server, a data center server, a server of a cloud computing environment, etc.) or a similar device. In some implementations, IPv4 server device 230 may receive network traffic from and/or provide network traffic to network device 220 via an IPv6 network.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
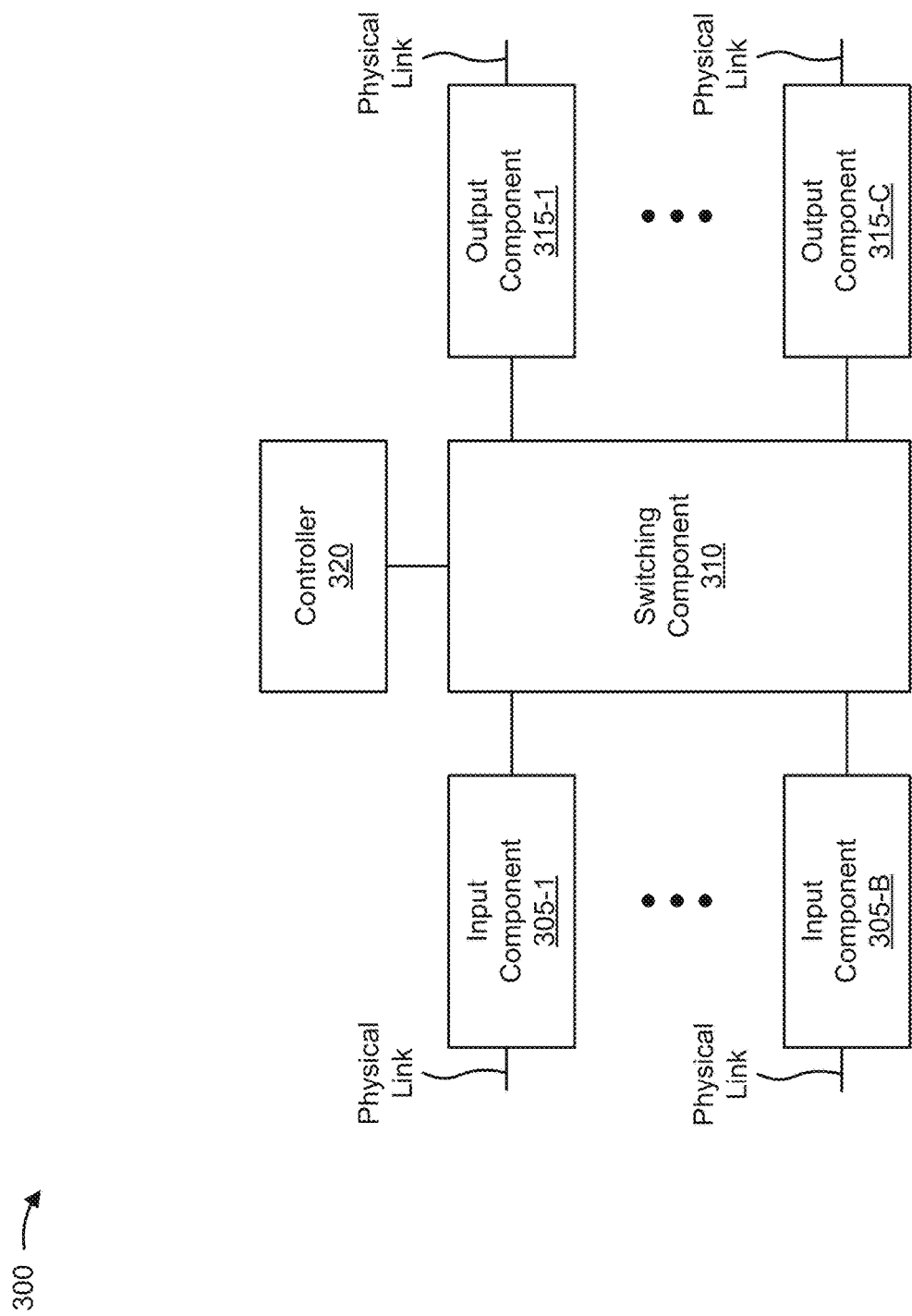
FIG. 3 is a diagram of example components of one or more devices of FIG. 2.

FIG. 3 is a diagram of example components of a device 300. Device 300 may correspond to peer device 210, network device 220, and/or IPv4 server device 230. In some implementations, peer device 210, network device 220, and/or IPv4 server device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of software and hardware. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create NAT mapping tables based on the network topology information, create forwarding tables based on the NAT mapping tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
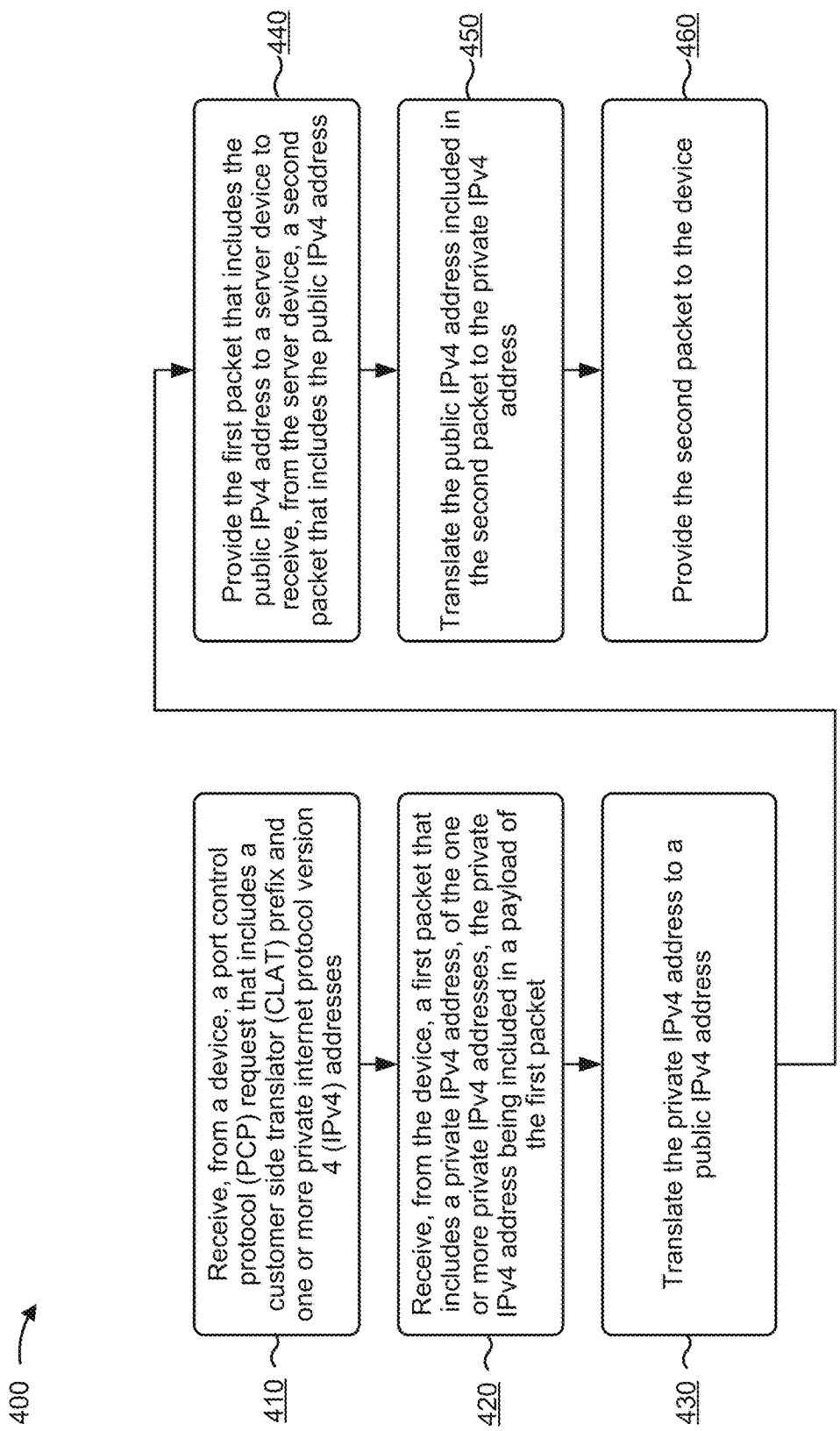
FIG. 4 is a flow chart of an example process for sending and receiving packets between a first device that supports internet protocol version 4 (IPv4) and a second device that supports IPv4 via an internet protocol version 6 (IPv6) network.

FIG. 4 is a flow chart of an example process 400 for sending and receiving packets between a first device that supports internet protocol version 4 (IPv4) and a second device that supports IPv4 via an internet protocol version 6 (IPv6) network. In some implementations, one or more process blocks of FIG. 4 may be performed by network device 220. In some implementations, one or more process blocks of FIG. 4 may be performed by another device or a group of devices separate from or including network device 220, such as peer device 210 and/or IPv4 server device 230.

As shown in FIG. 4, process 400 may include receiving, from a device, a port control protocol (PCP) request that includes a customer side translator (CLAT) prefix and one or more private internet protocol version 4 (IPv4) addresses (block 410). For example, network device 220 may receive, from peer device 210, a PCP request that includes a CLAT prefix and one or more private IPv4 addresses in a header of the PCP request. The CLAT prefix may serve as a key that a CLAT and/or a provider side translator (PLAT) may use when performing a translation between different versions of IP (e.g., IPv4 to IPv6, IPv6 to IPv4, etc.). Additionally, after receiving the PCP request, network device 220 may store the CLAT prefix and the one or more private IPv4 addresses using a data structure (e.g., a NAT mapping table, a forwarding table, or the like).

In some implementations, peer device 210 may configure a PCP request to include a CLAT prefix and one or more private IPv4 addresses. For example, peer device 210 may configure a header of the PCP request to include a CLAT prefix and one or more private IPv4 addresses in an option portion of the header. The option portion may include a set of bits reserved for performing additional functionality (e.g., functionality not ordinarily included in a PCP request). In this case, a PCP opcode within the PCP header may be extended using the option portion (e.g., a MAP opcode, a PEER opcode, an ANNOUNCE opcode, etc.).

As an example, assume that an application using IPv4 is hosted on peer device 210 and that peer device 210 hosts the CLAT. In this case, peer device 210 may configure a PCP request by including a CLAT prefix and a private IPv4 address in an option portion of the PCP header.

As another example, assume that one or more first peer devices 210 (e.g., a work station, a laptop, a mobile device, etc.) are using a second peer device 210 (e.g., a router, a gateway, a modem, etc.) to access the Internet. Further assume the one or more first peer devices 210 are associated with one or more private IPv4 addresses and that the second peer device 210 hosts the CLAT. In this case, the second peer device 210 may configure a PCP request by including a CLAT prefix and the one or more private IPv4 addresses in an option portion of the PCP header.

In some implementations, network device 220 may process the PCP request to identify the CLAT prefix and the one or more private IPv4 addresses. For example, network device 220 may process a header of the PCP request to identify the CLAT prefix and the one or more private IPv4 addresses included in the option portion of the PCP header.

In some implementations, network device 220 may store the CLAT prefix and the one or more private IPv4 addresses. For example, network device 220 may store the CLAT prefix and the one or more private IPv4 addresses using a data structure, such as a linked-list, an array, a tree, a hash table, and/or the like. In some cases, network device 220 may store the CLAT prefix and the one or more private IPv4 addresses separately. In other cases, network device 220 may concatenate the CLAT prefix to each the one or more private IPv4 addresses, and may store the concatenated value. In this way, network device 220 is able to establish an association between the CLAT prefix and the one or more private IPv4 addresses.

In some implementations, network device 220 may provide a PCP response to peer device 210. For example, network device 220 may provide a PCP response indicating that the PCP request was received. In this case, the device hosting the CLAT receives acknowledgement indicating that a connection is established between peer device 210 and network device 220, and that peer device 210 may begin sending packets to network device 220.

In this way, network device 220 may use the CLAT prefix and the one or more private IPv4 addresses to translate private IPv4 addresses that may be included in a payload of subsequent packets transmitted over the IPv6 network, as described further herein.

As further shown in FIG. 4, process 400 may include receiving, from the device, a first packet that includes a private IPv4 address, of the one or more private IPv4 addresses, the private IPv4 address being included in a payload of the first packet (block 420). For example, network device 220 may receive, from peer device 210, a first packet that includes a private IPv4 address in a payload of the packet and a second instance of the private IPv4 address in a header of the packet. In some cases, the payload of the packet may include a set of private IPv4 addresses, and only one private IPv4 address of the set of private IPv4 addresses may have a second instance included in the header of the packet.

In some implementations, prior to network device 220 receiving the first packet, peer device 210 may translate the first packet from an IPv4 packet to an IPv6 packet. For example, a CLAT of peer device 210 may perform a stateless translation of the packet to translate the first packet from an IPv4 packet to an IPv6 packet. In this case, the CLAT may translate the second instance of the private IPv4 address to an IPv6 address by appending the CLAT prefix to the second instance of the private IPv4 address. Additionally, the CLAT may be unable to translate the private IPv4 addresses included in the payload of the first packet.

In some implementations, network device 220 may receive an IPv6 packet from peer device 210. For example, network device 220 may receive, via an IPv6 network, an IPv6 packet that includes the private IPv4 address in a payload of the IPv6 packet. As an example, assume peer device 210 hosts an IPv4 application and a CLAT. Further assume that peer device 210 provides a packet to network device 220. In this case, network device 220 may support ALG (e.g., to manage file transfer protocol (FTP), session initiation protocol (SIP), etc.), and may receive the packet (e.g., as an IPv6 packet) that includes a private IPv4 address in a payload of the packet.

In this way, network device 220 is able to receive a first packet that includes a private IPv4 address in a payload of the first packet, and may perform one or more actions to translate the private IPv4 address to a public IPv4 address.

As further shown in FIG. 4, process 400 may include translating the private IPv4 address to a public IPv4 address (block 430). For example, network device 220 may identify the second instance of the private IPv4 address from the IPv6 address, and may utilize NAT to translate the private IPv4 address included in the payload to a public IPv4 address, as described in detail below.

In some implementations, network device 220 may identify the second instance of the private IPv4 address that is included in the IPv6 address. For example, network device 220 may identify the second instance of the private IPv4 address by removing the CLAT prefix from the IPv6 address. In this case, network device 220 may assign a public IPv4 address to the second instance of the private IPv4 address using an IP address selection algorithm, such as an algorithm that selects a highest available public IPv4 address, a lowest available public IPv4 address, a random public IPv4 address (e.g., using a random number generator), or the like. Additionally, network device 220 may update the NAT mapping table to store the IPv6 address and an association between the second instance of the private IPv4 address and the assigned public IPv4 address.

Additionally, network device 220 may search the payload of the IPv6 packet to identify the private IPv4 address, and may search the NAT mapping table for matching private IPv4 addresses (e.g., the second instance of the private IPv4 address). If a match is located, network device 220 may use the NAT mapping table to identify the assigned public IPv4 address that is associated with the second instance of the private IPv4 address, and may replace the private IPv4 address in the payload of the packet with the assigned public IPv4 address.

Additionally, network device 220 may translate the first packet from an IPv6 packet to an IPv4 packet. For example, network device 220 may translate the first packet to an IPv4 packet to allow the first packet to be processed by IPv4 server device 230. In this case, the first packet may be translated to an IPv4 packet, and may include the selected public IPv4 address in a payload of the first packet.

In this way, network device 220 may translate the private IPv4 address included in the payload to a public IPv4 address.

As further shown in FIG. 4, process 400 may include providing the first packet that includes the public IPv4 address to a server device to receive a second packet from the server device (block 440). For example, network device 220 may provide the first packet that includes the public IPv4 address to IPv4 server device 230, which may cause IPv4 server device 230 to provide a second packet (e.g., a reply packet). In this case, IPv4 server device 230 may initiate a connection based on the public IPv4 address included in the payload of the packet. In some cases, the public IPv4 address may be included in a payload of the second packet.

In this way, a first packet that includes a private IPv4 address in a payload of the packet may be transmitted from a first device that supports IPv4 to a second device that supports IPv4, via an IPv6 network, even if one or more devices handling transmission of the first packet use an ALG. Furthermore, a second packet (e.g., a reply packet) may be provided from the second device to the first device, using the IPv6 network, as described further herein.

As further shown in FIG. 4, process 400 may include translating the public IPv4 address included in the second packet to the private IPv4 address (block 450). For example, network device 220 may use NAT to translate the public IPv4 address in the payload of the second packet (e.g., the IPv4 packet) to the private IPv4 address.

In some implementations, network device 220 may translate the public IPv4 address to the private IPv4 address. For example, network device 220 may search the payload of the second packet to identify the public IPv4 address, and may use the public IPv4 address to search the NAT mapping table for a matching public IPv4 address. In this case, network device 220 may identify the private IPv4 address that is associated with the public IPv4 address, and may replace the public IPv4 address with the identified private IPv4 address.

Additionally, network device 220 may translate the second packet from an IPv4 packet to an IPv6 packet. For example, network device 220 may translate the second packet to an IPv6 packet to allow the second packet to be provided to peer device 210 via the IPv6 network. In this case, the second packet may be translated to an IPv6 packet, and may include the private IPv4 address in the payload of the second packet.

In this way, network device 220 may translate the public IPv4 address to the private IPv4 address.

As further shown in FIG. 4, process 400 may include providing the second packet to the device (block 460). For example, network device 220 may provide the second packet to peer device 210, and peer device 210 (e.g., the CLAT of peer device 210) may translate the second packet and provide the second packet to one or more applications and/or devices that support IPv4.

In some implementations, peer device 210 may translate the second packet from an IPv6 packet to an IPv4 packet. For example, peer device 210 may translate the second packet to an IPv4 packet in a manner described elsewhere herein. In this way, peer device 210 is able to translate the second packet to an IPv4 packet to allow the second packet to be transmitted to applications and/or devices that support IPv4.

In some implementations, the CLAT of peer device 210 may provide the second packet to an application hosted by peer device 210 that supports IPv4. In some implementations, the CLAT of peer device 210 may provide the second packet to one or more additional peer devices 210 that support IPv4.

In this way, devices and/or applications that support IPv4 are able to receive reply packets from IPv4 server device 230, using an IPv6 network as an intermediary, even when the private IPv4 addresses associated with the devices and/or applications are included in a payload of an initial packet.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a peer device 210 that supports IPv4 may send and receive packets to IPv4 server device 230, using an IPv6 network as an intermediary. Additionally, by using a PCP request to obtain a CLAT prefix, network device 220 conserves processing resources relative to network devices with manually configured CLAT prefixes. Furthermore, automatically assigning CLAT prefixes during the PCP request improves scalability, and conserves network resources that might otherwise be used to manually configure hundreds of thousands, millions, or even billions of CLAT prefixes associated with ISPs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    configuring, by a first device, a port control protocol (PCP) request to include a customer side translator (CLAT) prefix and one or more private internet protocol version 4 (IPv4) addresses;
    providing, by the first device and to a second device, the PCP request;
    translating, by the first device and based on receiving a response to the PCP request, a first IPv4 packet to an internet protocol version 6 (IPv6) packet that includes:
        a private IPv4 address of the one or more private IPv4 addresses, and
        a private IPv6 address that includes a second instance of the private IPv4 address;
    providing, by the first device and to the second device, the IPv6 packet,
        wherein the private IPv4 address is translated to a public IPv4 address using the CLAT prefix, and
        wherein the private IPv4 address, in a payload of the IPv6 packet, is replaced with the public IPv4 address;
    receiving, by the first device, from the second device, and based on providing the IPv6 packet, a reply packet,
        a payload of the reply packet including the private IPv4 address; and
    translating, by the first device, the reply packet to a second IPv4 packet.

2. The method of claim 1, wherein a CLAT of the first device receives the first IPv4 packet from an IPv4 application hosted by the first device,
    a payload of the first IPv4 packet including the private IPv4 address, and
    a header of the first IPv4 packet including the second instance of the private IPv4 address; and
    wherein translating the first IPv4 packet to the IPv6 packet comprises:
        translating the first IPv4 packet to the IPv6 packet based on the CLAT receiving the first IPv4 packet from the IPv4 application.

3. The method of claim 2, wherein the CLAT appends the CLAT prefix to the second instance of the private IPv4 address to convert the second instance of the private IPv4 address to the private IPv6 address.

4. The method of claim 1, wherein a CLAT of the first device provides the second IPv4 packet to an IPv4 application hosted by the first device.

5. The method of claim 1, wherein the reply packet is an IPv6 packet.

6. The method of claim 1, wherein translating the first IPv4 packet to the IPv6 packet comprises:
    translating the second instance of the private IPv4 address to the private IPv6 address by appending the CLAT prefix to the second instance of the private IPv4 address.

7. The method of claim 1, further comprising:
    providing, by a CLAT of the first device, the second IPv4 packet to another device that supports IPv4.

8. A first device, comprising:
    one or more memories; and
    one or more processors configured to:
        configure a port control protocol (PCP) request to include a customer side translator (CLAT) prefix and one or more private internet protocol version 4 (IPv4) addresses;
        provide, to a second device, the PCP request;
        translate, based on receiving a response to the PCP request, a first IPv4 packet to an internet protocol version 6 (IPv6) packet that includes:
            a private IPv4 address of the one or more private IPv4 addresses, and
            a private IPv6 address that includes a second instance of the private IPv4 address;
        provide, to the second device, the IPv6 packet,
            wherein the private IPv4 address is translated to a public IPv4 address using the CLAT prefix, and
            wherein the private IPv4 address, in a payload of the IPv6 packet, is replaced with the public IPv4 address;
        receive from the second device, and based on providing the IPv6 packet, a reply packet,
            a payload of the reply packet including the private IPv4 address; and
        translate the reply packet to a second IPv4 packet.

9. The first device of claim 8, wherein a CLAT of the first device receives the first IPv4 packet from an IPv4 application hosted by the first device,
    a payload of the first IPv4 packet including the private IPv4 address, and
    a header of the first IPv4 packet including the second instance of the private IPv4 address; and
    wherein the one or more processors, when translating the first IPv4 packet to the IPv6 packet, are configured to:
        translate the first IPv4 packet to the IPv6 packet based on the CLAT receiving the first IPv4 packet from the IPv4 application.

10. The first device of claim 9, wherein the CLAT appends the CLAT prefix to the second instance of the private IPv4 address to convert the second instance of the private IPv4 address to the private IPv6 address.

11. The first device of claim 8, wherein a CLAT of the first device provides the second IPv4 packet to an IPv4 application hosted by the first device.

12. The first device of claim 8, wherein the reply packet is an IPv6 packet.

13. The first device of claim 8, wherein the one or more processors, when translating the first IPv4 packet to the IPv6 packet, are configured to:
    translate the second instance of the private IPv4 address to the private IPv6 address by appending the CLAT prefix to the second instance of the private IPv4 address.

14. The first device of claim 8, wherein the one or more processors are further configured to:
    provide, by a CLAT of the first device, the second IPv4 packet to another device that supports IPv4.

15. A non-transitory computer-readable medium storing instructions, the instructions comprising:
    one or more instructions that, when executed by one or more processors of a first device, cause the one or more processors to:
        configure a port control protocol (PCP) request to include a customer side translator (CLAT) prefix and one or more private internet protocol version 4 (IPv4) addresses;
        provide, to a second device, the PCP request;

translate, based on receiving a response to the PCP request, a first IPv4 packet to an internet protocol version 6 (IPv6) packet that includes:
   a private IPv4 address of the one or more private IPv4 addresses, and
   a private IPv6 address that includes a second instance of the private IPv4 address;
provide, to the second device, the IPv6 packet,
   wherein the private IPv4 address is translated to a public IPv4 address using the CLAT prefix, and
   wherein the private IPv4 address, in a payload of the IPv6 packet, is replaced with the public IPv4 address;
receive from the second device, and based on providing the IPv6 packet, a reply packet,
   a payload of the reply packet including the private IPv4 address; and
translate the reply packet to a second IPv4 packet.

16. The non-transitory computer-readable medium of claim 15, wherein a CLAT of the first device receives the first IPv4 packet from an IPv4 application hosted by the first device,
   a payload of the first IPv4 packet including the private IPv4 address, and
   a header of the first IPv4 packet including the second instance of the private IPv4 address; and wherein the one or more instructions, that cause the one or more processors to translate the first IPv4 packet to the IPv6 packet, cause the one or more processors to:
   translate the first IPv4 packet to the IPv6 packet based on the CLAT receiving the first IPv4 packet from the IPv4 application.

17. The non-transitory computer-readable medium of claim 15, wherein the CLAT appends the CLAT prefix to the second instance of the private IPv4 address to convert the second instance of the private IPv4 address to the private IPv6 address.

18. The non-transitory computer-readable medium of claim 15, wherein a CLAT of the first device provides the second IPv4 packet to an IPv4 application hosted by the first device.

19. The non-transitory computer-readable medium of claim 15, wherein the reply packet is an IPv6 packet.

20. The non-transitory computer-readable medium of claim 15, wherein the one or more instructions, that cause the one or more processors to translate the first IPv4 packet to the IPv6 packet, cause the one or more processors to:
   translate the second instance of the private IPv4 address to the private IPv6 address by appending the CLAT prefix to the second instance of the private IPv4 address.

* * * * *